United States Patent
Watson et al.

(10) Patent No.: US 10,171,556 B2
(45) Date of Patent: Jan. 1, 2019

(54) SYSTEMS AND METHODS FOR DISTRIBUTING RECORDED MESSAGES TO A VEHICLE PUBLIC ANNOUNCEMENT SYSTEM

(71) Applicant: PANASONIC AVIONICS CORPORATION, Lake Forest, CA (US)

(72) Inventors: Philip Watson, Lake Forest, CA (US); Steven Bates, Mission Viejo, CA (US)

(73) Assignee: PANASONIC AVIONICS CORPORATION, Lake Forest, CA (US)

( * ) Notice: Subject to any disclaimer, the term of this patent is extended or adjusted under 35 U.S.C. 154(b) by 92 days.

(21) Appl. No.: 15/342,018

(22) Filed: Nov. 2, 2016

(65) Prior Publication Data

US 2018/0124154 A1 May 3, 2018

(51) Int. Cl.
*H04L 29/08* (2006.01)
*H04W 12/06* (2009.01)
*H04M 1/00* (2006.01)
*H04W 76/00* (2018.01)
*H04W 4/80* (2018.01)
*H04W 84/10* (2009.01)

(52) U.S. Cl.
CPC ............. *H04L 67/06* (2013.01); *H04L 67/12* (2013.01); *H04L 67/141* (2013.01); *H04M 1/00* (2013.01); *H04W 4/80* (2018.02); *H04W 12/06* (2013.01); *H04W 76/00* (2013.01); *H04W 84/10* (2013.01)

(58) Field of Classification Search
CPC ....................................................... H04L 67/06
USPC .......................................................... 709/217
See application file for complete search history.

(56) References Cited

U.S. PATENT DOCUMENTS

| | | | |
|---|---|---|---|
| 5,896,129 A | 4/1999 | Murphy et al. | |
| 8,185,374 B2 | 5/2012 | Kong et al. | |
| 8,934,893 B2 | 1/2015 | Lauer | |
| 9,158,908 B2 | 10/2015 | Hyde et al. | |
| 2005/0216938 A1* | 9/2005 | Brady, Jr. | H04L 29/06027 725/76 |
| 2008/0108328 A1 | 5/2008 | Lovell | |

(Continued)

OTHER PUBLICATIONS

PaMic—Bluetooth PA System, https://play.google.com/store/apps/details?id=com.appiclife.pamic&hl=en, printed: Sep. 9, 2016 (4pages).

(Continued)

*Primary Examiner* — David R Lazaro
*Assistant Examiner* — Zia Khurshid
(74) *Attorney, Agent, or Firm* — Brian Furrer

(57) ABSTRACT

Systems and methods for transferring a public announcement message to an onboard public announcement system (OPAS) installed on a vehicle using a personal electronic device. The personal electronic device establishes a wireless network connection to the OPAS to transmit a public announcement message stored on a personal electronic device. The personal electronic device transmits the public announcement message to the OPAS via the wireless network connection. The personal electronic device may download messages from a remote public announcement server for transfer to the OPAS. The personal electronic device may also record messages and control the playback of messages on the OPAS.

20 Claims, 3 Drawing Sheets

(56) References Cited

U.S. PATENT DOCUMENTS

| | | | |
|---|---|---|---|
| 2008/0187282 A1* | 8/2008 | Brady | H04N 5/073 |
| | | | 386/201 |
| 2014/0013365 A1 | 1/2014 | Ezaki et al. | |
| 2015/0079897 A1 | 3/2015 | Lauer | |
| 2016/0372114 A1* | 12/2016 | Klose | H04W 4/21 |

OTHER PUBLICATIONS

School PA System by INKids Education LLC, https://itunes.apple.com/us/app/school-pa-system/id553087145?mt=8, printed: Sep. 9, 2016 (2pages).

Watson, Philip et al., Crew Mobile Device-Based Content Loader for Entertainment System, U.S. Appl. No. 15/217,860, filed Jul. 22, 2016, unpublished (31pages).

Ghee, Ryan, Future Travel Experience, Sep. 23, 2015 (2 pages), www.futuretravelexperience.com.

* cited by examiner

SYSTEMS AND METHODS FOR DISTRIBUTING RECORDED MESSAGES TO A VEHICLE PUBLIC ANNOUNCEMENT SYSTEM

BACKGROUND

The field of the invention generally relates to public announcement systems (also referred to as public address systems or PA systems) for passenger vehicles, and more particularly, to systems and methods for distributing recorded messages to a public announcement system installed on a passenger vehicle.

Typically, common carrier passenger vehicles, such as airplanes, passenger trains, buses, cruise ships, etc., have an onboard public announcement system for presenting messages, such as safety announcements, status announcements, food and beverage announcements, promotional messages, connecting travel announcements, etc. The messages may be live messages such as announcements spoken into a microphone of the public announcement system by a crew member, or pre-recorded messages stored on a storage device of the system. The messages may be played over loudspeakers installed throughout the vehicle, through an in-seat entertainment unit (e.g., a video monitor and audio output) via a vehicle entertainment system, and/or other suitable modality. For example, many commercial passenger aircraft have an in-flight entertainment system (IFES) and a public announcement system including loudspeakers located throughout the aircraft cabin.

An IFES generally includes a centralized system management unit which is networked to a plurality of entertainment modules installed at each seat or at spaced locations throughout the aircraft cabin, such as mounted in each of the seatbacks of the passenger seats, in the aircraft ceiling, on bulkhead walls and/or deployable from an armrest. The system management unit may include a server for distributing multimedia content to each of the entertainment modules. Each entertainment module typically includes a control unit, a video display, an audio output (e.g., an audio/headphone jack), and a user input device (e.g., a remote control, touchscreen, etc.) for the passenger to control the operation of the entertainment module. The IFES and public announcement system may be integrated or separate systems operably coupled together such that public announcements may be played on the entertainment modules as well as being played over the loudspeakers.

Many of the public announcement messages presented over such public announcement systems in vehicles are pre-recorded messages which are prepared and recorded well in advance and then are loaded onto, and stored on the public announcement system in the vehicles. For instance, many safety messages, promotional messages, food and drink messages, embarking and disembarking procedure messages, and the like, are recorded messages which are loaded and stored on the public announcement system of the vehicles. However, the current methods for loading recorded messages onto public announcement system installed on vehicles entails physically carrying a recorded message loader having a storage device with recorded messages stored thereon, such as a hard disk drive, optical storage device (e.g., a CD or DVD), solid state storage device, or the like, onboard the vehicle, accessing a content server of public announcement system and connecting the storage device to the content server. A download or copy process is then initiated, and once completed, the recorded message loader is disconnected and removed from the vehicle. Due to the cumbersome and time consuming process for loading recorded messages, the recorded messages on the system are updated very infrequently resulting in fairly static recording that may not change for months or years. As a result, passengers, especially frequent travelers, tend to ignore the stale messages rather than listening to the announcements which may include important information, such as safety procedures. In addition, the recorded messages will not include up-to-date information, such as recent news, messages regarding current holidays, or messages in languages pertinent to current travel routes for the vehicle.

Accordingly, there is a need for improved systems and methods for distributing and/or playing recorded messages on public announcement systems installed on vehicles.

SUMMARY

In one embodiment, the present invention is directed to an innovative personal electronic device (also referred to herein a "PED") configured to receive and store recorded public announcement messages and to transfer such public announcement messages to an onboard public announcement system (also referred to as an "OPAS") installed on a passenger vehicle. The personal electronic device is a handheld electronic device having a storage device for storing electronic data, including the public announcement messages, a primary data networking module for establishing a wireless data network connection to the onboard public announcement system, and a message transfer software application configured to program the personal electronic device to perform various functions. The personal electronic device may be any suitable, portable, handheld electronic computing device having a computer processor and memory. The personal electronic device may be specially designed for loading public announcement messages onto an onboard public announcement system, or it may be a general purpose electronic computing device such as a smartphone, tablet computer, portable media player (e.g., an IPOD™ available from Apple Corp.) which is programmed by the message transfer software application to receive, store and transfer public announcement messages as described herein. The personal electronic device may also have a display such as an LCD display (liquid crystal display), or other suitable display and a user input device such as a keyboard, touchscreen, touchpad, or the like.

The primary data networking module may be any suitable wireless networking module, such as a WLAN (Wi-Fi) module, a cellular phone communication module, wireless USB, WiMAX, etc., which is compatible with an OPAS networking module of the onboard public announcement system such that a local data transfer link can be established between the personal electronic device and the onboard public announcement system.

The message transfer software application is configured to program the personal electronic device to establish a wireless local data transfer link to the onboard public announcement system using the primary data networking module. The application also programs the personal electronic device to transmit authentication data to the onboard public announcement system for authenticating the personal electronic device as being authorized to transmit recorded public announcement messages stored on the personal electronic device to the OPAS. After authentication of the personal electronic device, the personal electronic device transmits public announcement messages stored on the storage device to the onboard public announcement system. The onboard public announcement system stores the recorded public announcement messages on an OPAS storage device.

In another aspect of the present invention, the software application is configured to automatically transfer the public announcement messages to the OPAS when the personal electronic device is within wireless networking range of the OPAS. As used herein, the terms "automatically" and "automatic" mean that a function is performed without user intervention (except for powering on a device performing the function). In other words, a user does not enter any commands or perform any actions, other than powering on a device performing the function. Thus, the personal electronic device automatically establishes the local data transfer link to the OPAS when the personal electronic device is within wireless networking range of the OPAS. And after establishing the local data transfer link, the personal electronic device automatically transmits the authentication data to the OPAS, and after authentication, the personal electronic device automatically transmits the public announcement message(s) stored on the storage device to the OPAS.

In another aspect of the present invention, the onboard public announcement system may be a stand-alone system separate from any onboard entertainment system. Alternatively, the onboard public announcement system may be integrated with an onboard entertainment system, e.g., an IFES, or it may be a stand-alone system operably coupled to an onboard entertainment system. By integrating or coupling the public announcement system with an onboard entertainment system, public announcement messages may be presented via the onboard entertainment system, as well as playing them over loudspeakers of the onboard public announcement system.

In another aspect of the present invention, the authentication of the personal electronic device may be based upon a crew member manifest associating the personal electronic device to vehicle. In this way, the public announcement messages may be specific to the vehicle, such as the route of the vehicle, or type of vehicle (e.g., safety information for a particular type of aircraft such as a BOEING™ 777, or an AIRBUS A380), and the authentication ensures that the messages intended for the particular vehicle are transferred to the onboard public announcement system of the vehicle. This type of authentication also provides security by allowing the onboard public announcement system to determine whether the personal electronic device is authorized to transfer public announcement messages to the onboard public announcement system. In another aspect, the authentication data may be an authentication key, a password, an authentication key based upon a crew member manifest associating the personal electronic device to vehicle, and/or a machine identification code of the personal electronic device.

In yet another feature of the present invention, the software application may be configured to program the personal electronic device to establish a wireless remote data transfer link to a remote public announcement message server on which recorded public announcement messages are stored so that the personal electronic device can download public announcement messages from the remote public announcement message server via the remote data transfer link. The personal electronic device may utilize the primary networking module to establish the remote data transfer link. In another aspect, the personal electronic device may have a secondary wireless data networking module which can also be utilized to establish the remote data transfer link. The secondary data networking module operates on a different wireless modality than the primary data networking module. For example, if the primary data networking module is a Wi-Fi module then the secondary networking module may be a cellular phone communication module (e.g., GSM/EDGE, CDMA, etc.). The primary data networking module and secondary networking module may be integrated into a unitary module, or they may be separate components. The remote public announcement message server may be connected to the internet such that the remote public announcement message server is accessible by the personal electronic device via the internet. In such case, the remote data transfer link may also utilize the internet to establish the data connection between the personal electronic device and the remote public announcement message server.

In another aspect, the software application may be configured to program the personal electronic device to automatically download public announcement messages from the remote public announcement message server. For example, the software application may be configured to program the personal electronic device to automatically establish a remote data transfer link to a remote public announcement message server when the personal electronic device detects an internet connection. After establishing the remote data transfer link, the personal electronic device automatically downloads the public announcement message from the remote public announcement message server via the remote data transfer link and stores the public announcement message on the storage device.

In still another aspect of the present invention, the personal electronic device may also be configured to record public announcement messages input by a crew member via a message input device of the personal electronic device. The recorded public announcement message can be stored on the personal electronic device and transferred to the onboard public announcement system in the same manner as other recorded messages. The personal electronic device may be configured to include a digital signature in the recorded public announcement message so that the onboard public announcement system can authenticate the public announcement message. The message input device of the personal electronic device may be a microphone in which case the public announcement message is an audio message. The message input device may be a keyboard (including a virtual keyboard displayed on the display of the personal electronic device) such that the public announcement message comprises a text message. The recorded message may also be a video by using a video camera on the personal electronic device.

In still another feature of the present invention, the personal electronic device may also be configured to control the playback of public announcement messages on the onboard public announcement system. For example, the personal electronic device establishes a wireless network connection to the onboard public announcement system, and sends commands to the onboard public announcement system to select and play public announcement messages. The personal electronic device may display a graphical user interface on its display for controlling the playback of public announcement messages on the OPAS, including displaying a selectable list of public announcement messages stored on the onboard public announcement system. A crew member can select a public announcement message to play, and use playback controls to play the selected message. The user interface may also have zone controls for playing public announcement messages in particular zone(s) of the vehicle, such as in one or more of first class, business class and/or coach/economy class.

Another embodiment of the present invention is directed to a system for distributing public announcement messages to, and/or playing such messages on, a public announcement message system on a vehicle. The system includes an onboard public announcement system installed on a vehicle, same or similar to the one described above. For example, the onboard public announcement system has an OPAS networking module for establishing a wireless network connection, and an OPAS storage device for storing public announcement messages. The onboard public announcement system is configured to play public announcement messages to passengers on the vehicle.

The system also includes a personal electronic device, same or similar to the one described above. For instance the personal electronic device is a handheld computing device including a PED storage device, a PED networking module (e.g., a primary networking module) configured to establish a network connection to the OPAS networking module, and a PED software application. The PED software application is configured to program the personal electronic device to establish a wireless local data transfer link to the onboard public announcement system using the PED data networking module, and transmit authentication data to the onboard public announcement system for authenticating the personal electronic device to allow the personal electronic device to transmit the public announcement message to the OPAS. After authentication of the personal electronic device by the onboard public announcement system, transmit the public announcement message stored on the storage device to the onboard public announcement system.

The onboard public announcement system is configured to receive the authentication data from the personal electronic device, and determine whether to authenticate the personal electronic device based on the authentication data. After determining that the authentication data is valid, the onboard public announcement system may send an authentication message to the personal electronic device. After valid authentication of the personal electronic device, the onboard public announcement system receives the public announcement message from the personal electronic device and stores the public announcement message on the OPAS storage device.

In another aspect of the system, the system may also include a remote public announcement message server on which public announcement messages are stored. The PED software application is configured to program the personal electronic device to establish a remote data transfer link to the remote public announcement message server, download public announcement messages from the remote public announcement message server via the remote data transfer link, and store the public announcement messages on the PED storage device.

In additional aspects and features, the system may include any of the additional aspects described herein for the onboard public announcement system and/or the personal electronic device.

Another embodiment of the present invention is directed to methods for distributing public announcement messages. In one embodiment, the method comprises providing a personal electronic device, same or similar to the personal electronic device described above. A local data transfer link is established between the personal electronic device and the onboard public announcement system. Authentication data is transmitted from the personal electronic device to the onboard public announcement system for authenticating the personal electronic device to allow the personal electronic device to transmit public announcement messages stored on the personal electronic device to the onboard public announcement system. After authentication of the PED, the public announcement messages stored on the personal electronic device are transmitted to the onboard public announcement system.

In additional aspects of the method embodiment, the method may also include any of the additional aspects described herein for the personal electronic device, the for system for distributing public announcement messages to, and/or playing such messages on, a public announcement message system on a vehicle, and the onboard public announcement system.

Furthermore, although the embodiments described above are applied to connecting a single personal electronic device to an onboard public announcement system, the systems and methods may be configured to perform the same functionality to connect a plurality of personal electronic devices to one or more onboard public announcement system. In addition, segments of messages or different messages may be received by different personal electronic devices for transfer to the same onboard public announcement system. In this way, each of the personal electronic devices can transfer their respective segments or different messages to the same onboard public announcement system.

BRIEF DESCRIPTION OF THE DRAWINGS

The foregoing and other aspects of embodiments are described in further detail with reference to the accompanying drawings, wherein like reference numerals refer to like elements and the description for like elements shall be applicable for all described embodiments wherever relevant, wherein.

DETAILED DESCRIPTION

Figure 1:
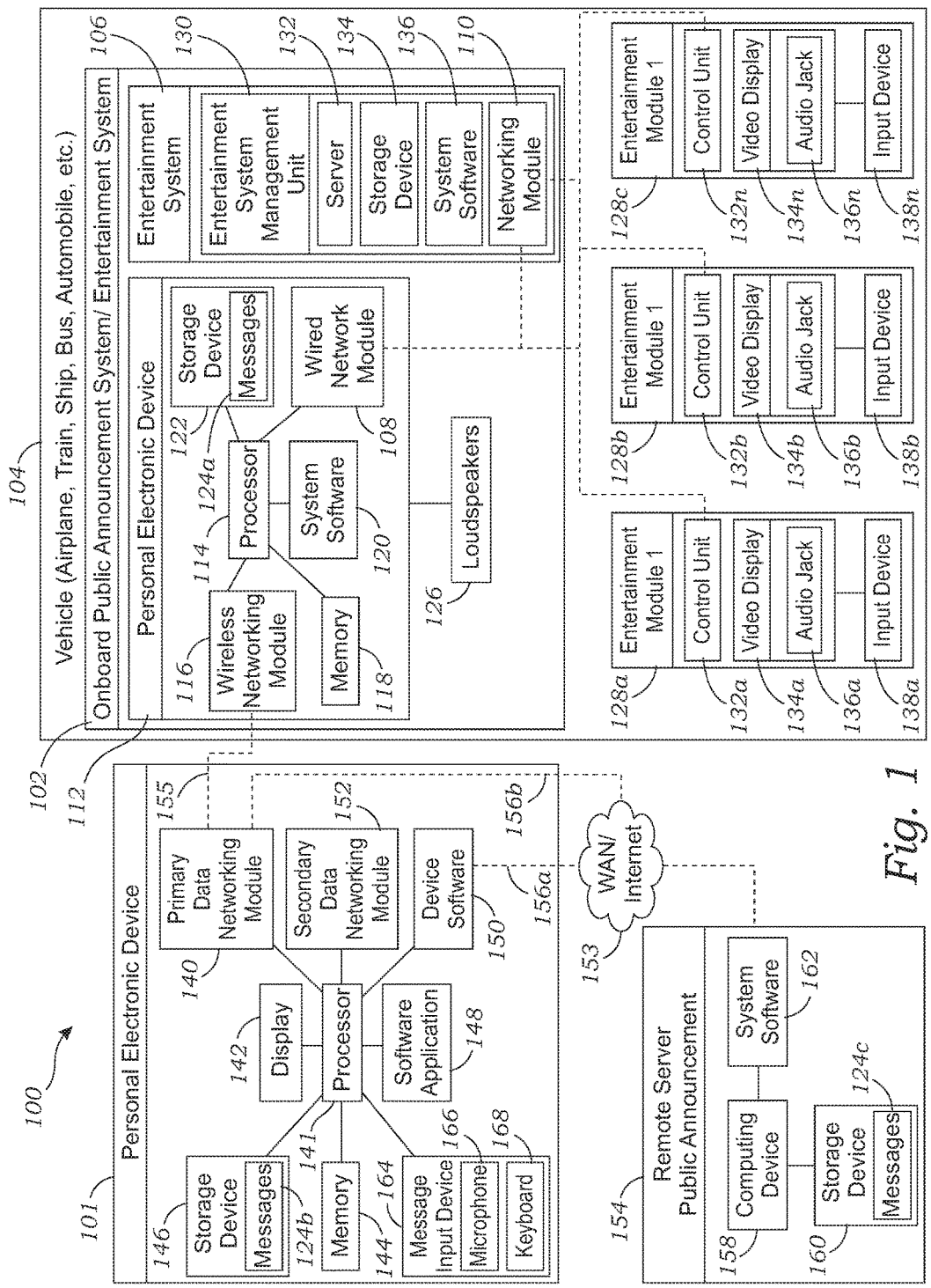
FIG. 1 is a block schematic diagram of a system for distributing recorded public announcement messages to an onboard public announcement system (OPAS) installed on a vehicle using a personal electronic device (PED), according to one embodiment of the present invention.

The present invention is directed to systems and methods for distributing recorded public announcement messages to an onboard public announcement message system (OPAS) installed on a vehicle using a personal electronic device (PED). Referring to FIG. 1, a schematic diagram of one embodiment of a system 100 for distributing recorded public announcement messages to an OPAS 102 installed in passenger vehicle 104 using a PED 101 is shown. The passenger vehicle 104 may be any type of passenger vehicle 104, such as an airplane, train, ship, bus, automobile, etc. having one or more passenger seats.

The OPAS 102 may be a stand-alone system or it may be integrated with an onboard entertainment system 106 (e.g., an in-flight entertainments system or "IFES"). In the case of a stand-alone system, the OPAS 102 may be connected and/or networked to an entertainment system 106 so that the systems may communicate with each other using respective networking modules 108 and 110. The OPAS 102 includes a computing device or server 112 which may be any suitable computing device or server having a processor 114, a wireless networking module 116, memory 118, system software 120, and a storage device 122 for storing recorded public announcement messages 124a. The OPAS 102 is configured to play the recorded public announcement messages 124a over loudspeakers 126 installed within the vehicle 104. The OPAS 102 may also be configured to play the recorded public announcement messages 124a on the plurality of entertainment modules 128 either directly or via the entertainment system 106.

The wireless networking module 116 may be any suitable wireless networking module which is compatible to establish a wireless local data transfer link 155 (via a wireless network connection) to a primary data networking module 140 of the PED 101, such as a WLAN (Wi-Fi) module, a cellular phone communication module, a wireless USB module, a WiMAX module, a Bluetooth module, an NFC module, etc. The wireless networking module 116 may comprise a plurality of wireless communication modules, such as a plurality of Wi-Fi modules, NFC modules or Bluetooth modules distributed throughout the vehicle 102. For instance, an NFC module may be provided at each passenger seat within the vehicle 104, or several Wi-Fi or Bluetooth modules may be spaced about the vehicle 104 to provide adequate signal strength to communicate with the personal electronic device 102 when located at various locations throughout the vehicle 104. For instance, aircraft frequently include one or more wireless access points (WAPs). The plurality of vehicle wireless communication modules 116 are each in operable communication with the server 112, such as through a local area network (e.g., an Ethernet network) or other suitable network.

The entertainment system 106 includes a central entertainment system management unit 130 which is networked to the plurality of entertainment modules 128. The entertainment system management unit 130 is a computer system for operating various functions of the entertainment system 106 on the vehicle 104. For example, the entertainment system management unit 130 is configured to perform audio/video entertainment functions, and may also include an onboard internet service system, and/or other onboard electronic functions. The entertainment system management unit 130 includes a server 132 comprising one or more computer processors, memory, a storage device 134 for electronically storing digital files such as multimedia content, system software 136 for programming the server 132 to perform the functions of the entertainment system management unit 130, and a networking module 110 for networking to the plurality of entertainment modules 128 and the server 112 of the OPAS 102. The entertainment system 106 also includes a plurality of entertainment modules 128a-128n which are installed throughout the vehicle 104. For example, the entertainment modules 128 may be installed at each seat within the vehicle 104, or installed at spaced apart locations throughout the vehicle, such as mounted in each of the seatbacks of the passenger seats, in the aircraft ceiling, on bulkhead walls and/or deployable from an armrest. Each of the entertainment modules 128 is networked to the entertainment system management unit 130. The entertainment modules 128 may be networked to the entertainment system management unit 130 using a wired communication network (e.g., an Ethernet network), or a wireless network (e.g., Wi-Fi), or a combination of wired and wireless networks. Each of the entertainment modules 128a-128n includes a control unit 132, a video display 134 (e.g., LCD, AMOLED, etc.), an audio jack 136, and a user input device 138 such as a remote control, touchscreen, or other suitable device.

The PED 101 may be any suitable, portable, electronic computing device having wireless communication capability. The PED 101 is more convenient as a handheld, battery-operated device. As some examples, the personal electronic device may be designed specifically as a vehicle crew member device configured to load public announcement messages onto the OPAS 102, or it may be a commercially available electronic device such as a portable computing device such as a smartphone, tablet computer, portable media player (e.g., an IPOD™ available from Apple Corp.) which can execute software applications. As shown in FIG. 1, the PED 101 includes a processor 141, a display 142 (e.g., an LCD, LED or other display), memory 144, a storage device 146, device software 150 and a message transfer software application 148. The storage device 146 stores one or more public announcement messages 124b. The device software 150 programs the PED 101 to perform its general functionality, for example, phone functions (e.g., if it is a smartphone), and other general purpose functions. The software application 148 is configured to program the PED 101 to perform the functions for downloading and transferring recorded public announcement messages 124 to the OPAS 102.

The PED 101 also has a primary data networking module 140 which is compatible for establishing a wireless network connection with the wireless networking module 116. As described above, the wireless networking standard for the primary data networking module 140 and the wireless networking module 116 may be any suitable wireless networking standard, such as a WLAN (Wi-Fi) module, a cellular phone communication module, a wireless USB module, a WiMAX module, a Bluetooth module, an NFC module, etc.

In addition, the PED 101 may include a secondary data networking module 152 which is compatible to establish a wireless network connection to a wide area network 154 in order to establish a remote data transfer link 156 to a remote public announcement server 154 having stored recorded public announcement messages 124c. The PED 101 may then download messages 124c from the remote public announcement server 154 via the remote data transfer link 156. The wide area network (WAN) 153 may include one or more networks, including local area networks, wide area networks, and the internet, in order to establish a remote data transfer link 156a to the remote public announcement server 154. The secondary data networking module 152 may be any suitable wireless networking module, such as a WLAN (Wi-Fi) module, a cellular phone communication module, a wireless USB module, a WiMAX module, a Bluetooth module, an NFC module, etc., which can connect to the wide area network 154. The secondary data networking module 152 is typically a networking module which operates on a different modality than the primary data networking module 140, because if the PED 101 can establish the remote data transfer link 156b using the primary data networking module 140, then there may be no need for a secondary data networking module 152. For instance, if the primary data networking module 140 is a Wi-Fi module, then the secondary networking module 152 may be a cellular phone communication module, such as GSM/EDGE, CDMA, etc., a Bluetooth module, a wireless USB module, or NFC module.

The remote public announcement server 154 includes a computing device 158 which may be any suitable computing device, such as a computer server, personal computer, etc. The remote public announcement server 154 also includes a storage device 160 having recorded public announcement messages 124*c* stored thereon. The remote public announcement server 154 also has system software 162 for programming the remote public announcement server 154 to perform the necessary functions to transfer recorded public announcement messages 124*c* to the PED 101.

Figure 2:
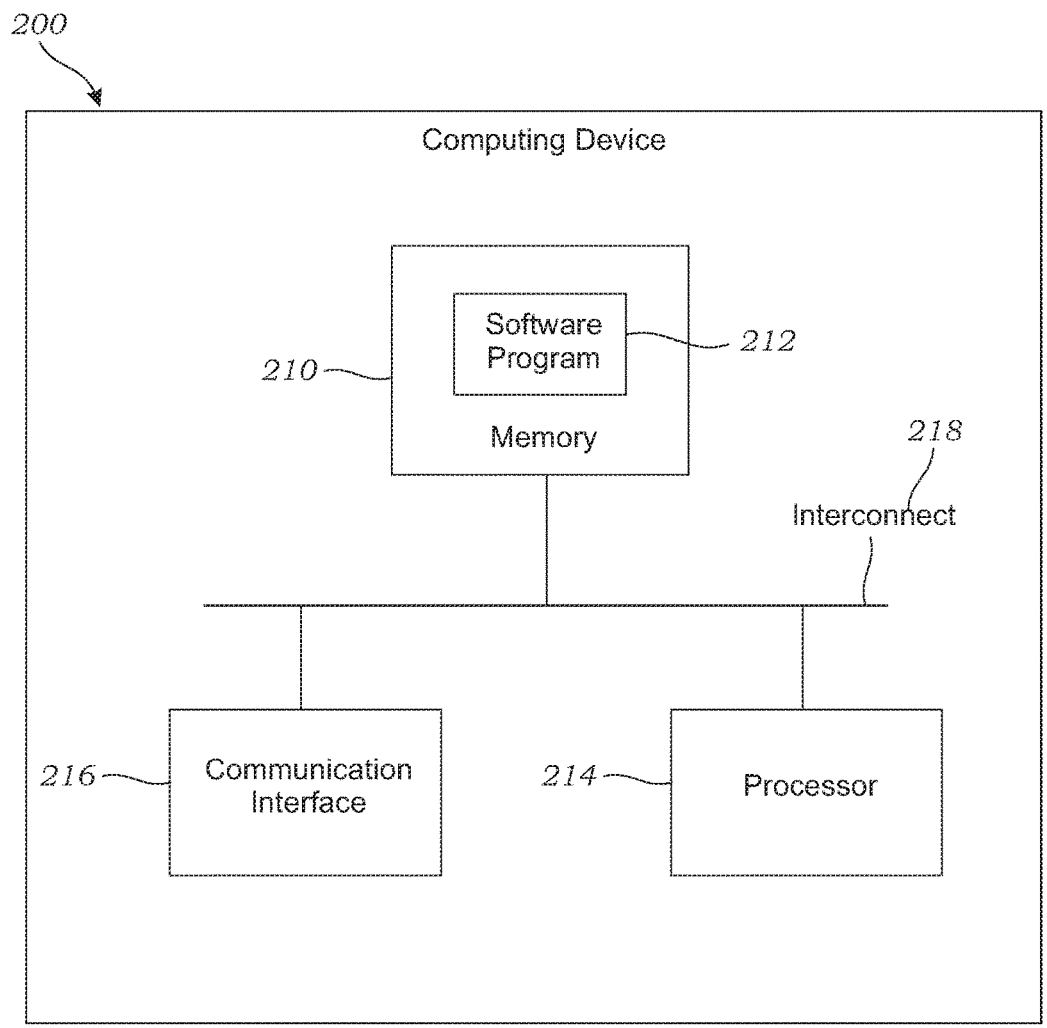
FIG. 2 is a block diagram of a computing device (computer) which may be utilized in the personal electronic device, the public announcement system/entertainment system and/or the remote public announcement server of the system of FIG. 1, according to one embodiment.

FIG. 2 generally shows a block diagram of the components of an example of a computer (computing device) 200 that may be used as the computing device 158 in the remote public announcement server 154, and/or the computing device 112 of the OPAS 102, and/or a computing device in the personal electronic device 101 The computing device 200 includes memory 210, an application software program 212, a processor or controller 214 to execute the application software 212, a network or communications interface 216, e.g., for communications with a network or interconnect 218 between the components. The memory 210 may be or include one or more of cache, RAM, ROM, SRAM, DRAM, RDRAM, EEPROM, SDRAM and other types of volatile or non-volatile memory capable of storing data. The processor unit 214 may be or include multiple processors, a single threaded processor, a multi-threaded processor, a multi-core processor, or other type of processor capable of processing data. Depending on the particular system component (e.g., whether the component is a computer or a hand held mobile communications device), the interconnect 218 may include a system bus, LDT, PCI, ISA, or other types of buses, and the communications or network interface may, for example, be an Ethernet interface, a Frame Relay interface, or other interface. The network interface 216 may be configured to enable a system component to communicate with other system components across a network which may be a wireless network or various other communication networks. It should be noted that one or more components of computing device 200 may be located remotely and accessed via a network. Accordingly, the system configuration provided in FIG. 2 is provided to generally illustrate how embodiments may be configured and implemented.

Figure 3:
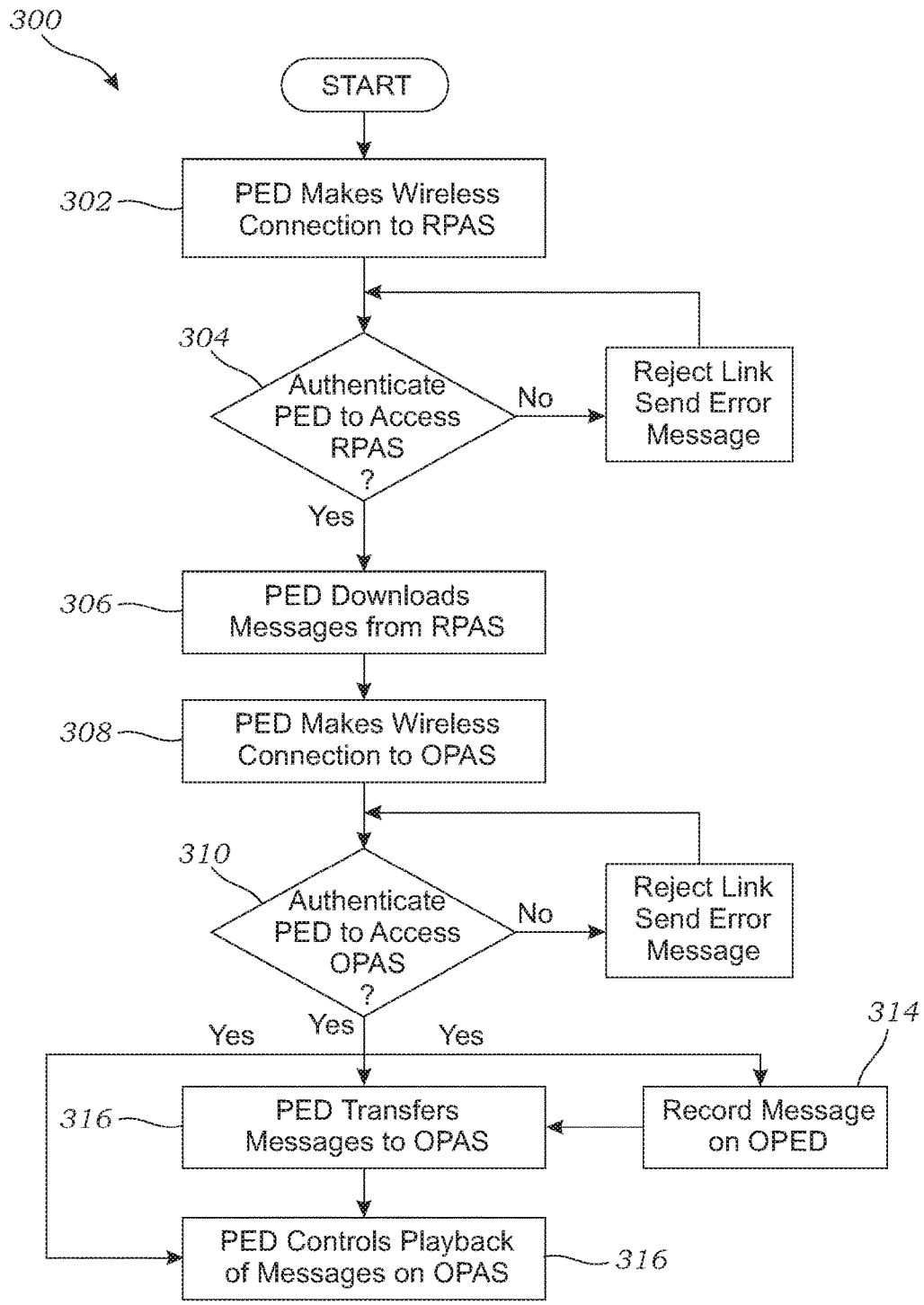
FIG. 3 illustrates an exemplary flow chart of a method for distributing recorded public announcement messages to a public announcement system installed on a vehicle using the system of FIG. 1, according to one embodiment of the present invention.

Turning now to FIG. 3, an exemplary embodiment of a method 300 having algorithms for distributing recorded public announcement messages to the OPAS 102 installed on a vehicle 104 using the PED 101 is shown. Each of the sub-systems of the system 100, including the OPAS 102, the PED 101, the remote public announcement server 104 and the entertainment system 106 are configured to execute their respective system software and/or software applications to perform the functions of the method 300, and therefore, when a function is described as being performed by one of the sub-systems, it is understood that such sub-system is executing its software to program the sub-system to perform the function.

Referring to FIG. 3, at step 302, the PED 101 establishes a wireless remote data transfer link 156 with the remote public announcement server 154 (RPAS) in order to download one or more public announcement messages 124*c* from the remote public announcement server 154 and store them on the PED 101. The PED 101 may utilize the primary data networking module 140 if it is compatible with a WAN access point to a WAN 153 within range of the PED 101 (or if the PED 101 only includes a primary data networking module), or it may utilize the secondary data networking module 152 if the primary data networking module 140 is not within range of a compatible WAN access point but is within range of a WAN access point which is compatible with the secondary data networking module 152. The PED 101 may be configured to automatically connect to a WAN access point using one of the primary data networking module 140 or the secondary data networking module 152 when the PED 101 is within range of a compatible WAN access point. Alternatively, the PED 101 may be configured to only connect to a WAN access point when prompted by a user (e.g., a crewmember) to do so. For example, the PED 101 may detect available WAN access point(s) and then display a network connection function which allows the user to select a WAN access point and to prompt the PED 101 to connect to the selected WAN access point. The PED 101 may have multiple settings which allow the PED 101 to be configured for automatic connection or prompted connection to a WAN access point.

At step 304, after making a wireless connection to a WAN access point, the PED 101 and remote public announcement server 154 perform an authentication process to permit the PED 101 to access the remote public announcement server 154 and download public announcement messages 124*c* from the remote public announcement server 154. The authentication may be a standard login procedure using credentials such as a username and password, or a PED 101 device identifier and authentication key, or the like. Accordingly, the PED 101 transmits authentication data to the remote public announcement server 154 and the remote public announcement server 154 receives the authentication data. The authentication data may include a crewmember identifier and/or PED 101 identifier which the remote public announcement server 154 can utilize to determine which public announcement messages 124*c* to transfer to the PED 101. The remote public announcement server 154 receives the authentication data and determines if the authentication data is valid. If the authentication data is valid, then the PED 101 establishes a remote data transfer link 156 with the remote public announcement server 154. If the authentication data is not valid, then the remote public announcement server 154 does not allow the PED 101 to access the remote public announcement server 154 and may also send a message to the PED 101 indicating that the authentication data is invalid. When the authentication fails, the authentication process may repeat until a valid authentication or until a maximum number of attempts is reached. The authentication process may be automatic, i.e., performed with user intervention, or it may require a user to input credentials and/or commands into the PED 101.

After authentication and establishing the remote data transfer link 156, at step 306, the PED 101 downloads one or more public announcement messages 124*c* stored on the storage device 160 of the remote public announcement server 154 via the remote data transfer link 156. The remote public announcement server 154 and/or the PED 101 use the crewmember and/or PED 101 identifier to determine which public announcement messages 124*c* to transfer to the PED 101. This determination may be based upon a crewmember manifest which cross-references the crewmember and/or the particular PED 101 to a particular vehicle 104 and/or OPAS 102 to which specific messages are scheduled to be loaded. Step 306 may also be automatic, or prompted in which it requires user input and/or commands to perform the download.

In an automatic mode, the remote public announcement server 154 and/or the PED 101 automatically determine which public announcement messages 124*c* to download onto the PED 101, and then automatically download such public announcement messages 124*c* and store them on the storage device 146 of the PED 101. In the automatic mode, after establishing the remote data transfer link, the PED 101 may receive a connection message from the remote public announcement message server 154, and the PED may respond by sending a "ready to receive" message to the remote public announcement message server 154. In response to the "ready to receive" message, the remote public announcement message server 154 automatically transmits, and the PED 101 automatically receives, the public announcement messages 124c stored on the remote public announcement message server 154.

In a prompted mode, the remote public announcement server 154 and/or the PED 101 determine which messages 124c are available and recommended for download to PED 101, then display a list of public announcement messages 124c on the PED 101 from which the user can select, and then download the selected messages 124 to the PED 101 for storage on the storage device 146 of the PED 101.

Using either the automatic mode or the prompted mode, after the messages 124c are downloaded to the PED 101, the PED 101 and/or remote public announcement server 154 may then terminate the remote data transfer link.

At step 308, the PED 101 establishes a wireless local data transfer link 155 with the OPAS 102 in order to transfer one or more public announcement messages 124b from the PED 101 to the OPAS 102 and store them on the storage device 122 of the OPAS 102. The PED 101 utilizes the primary data networking module 140 to make a wireless connection 155 to the wireless networking module 116 of the OPAS 102. Similar to the connection to the remote public announcement server 154, the PED 101 may be configured to automatically make the wireless connection to the OPAS 102 when the PED 101 is within range of the OPAS 102. The PED 101 may utilize an OPAS identifier, such as an OPAS identifier received from the remote public announcement server 154 when downloading messages 124 from the remote public announcement server 154, or otherwise provided to the PED 101 (e.g., provided by a central scheduling server or previously entered into the PED 101) to identify a scheduled OPAS 102 to which the PED 101 is supposed to connect. For instance, the PED 101 may be within range of multiple OPAS's 102 on different vehicles 102, such that the PED 101 must automatically connect to the correct OPAS 102. The OPAS identifier may be based upon a crewmember and/or PED manifest which associates a crewmember and/or the crewmember's assigned PED 101 to a particular vehicle 104 and/or OPAS 102 on such vehicle 104.

Alternatively, the PED 101 may be configured to only connect to the OPAS 102 when prompted by a user (e.g., a crewmember) to do so. For instance, the PED 101 may detect that one or more OPAS's 102 are within range and then display a network connection function which allows the user to select an OPAS 102 and then prompt the PED 101 to connect to the selected OPAS 102. The prompted connection may also utilize the OPAS identifier as described above. For example, the PED 101 may only display the scheduled OPAS 102 for selection, or it may display the scheduled OPAS 102 at the top of the list, or otherwise highlighted in the list. The PED 101 may have multiple settings which allow the PED 101 to be configured for automatic connection or prompted connection to the OPAS 102.

At step 310, after making a wireless network connection to the OPAS 102, the PED 101 and OPAS 102 perform an authentication process to permit the PED 101 to access the OPAS 102 and download public announcement messages 124b from the PED 101 to the OPAS 102. The authentication may be the same or similar to the authentication of the PED 101 with the remote public announcement server 154, as described above. The authentication may be a standard login procedure using credentials such as a username and password, or a PED 101 device identifier and authentication key, or the like. The authentication data may be based upon the crewmember manifest so that the authentication will only be valid if the crewmember manifest indicates that the particular PED 101 is scheduled to transfer public announcement messages 124b to the particular vehicle 104 and/or OPAS 102, and/or at a particular time or scheduled itinerary for the particular vehicle 104. Accordingly, the PED 101 transmits authentication data to the OPAS 102 and the OPAS 102 receives the authentication data. The PED 101 and OPAS 102 may exchange identifier information, such as a crewmember and/or PED 101 identifier and OPAS identifier (e.g., if it was not obtained by the PED 101 when making the wireless connection described above) so that the PED 101 which the PED 101 and OPAS 102 can utilize to determine which public announcement messages 124b to transfer from the PED 101 to the OPAS 102. The OPAS 102 receives the authentication data and determines if the authentication data is valid. If the authentication data is valid, then the PED 101 establishes a remote data transfer link 156 with the OPAS 102. If the authentication data is not valid, then the OPAS 102 does not allow the PED 101 to access the OPAS 102 and may also send a message to the PED 101 indicating that the authentication data is invalid. When the authentication fails, the authentication process may repeat until a valid authentication or until a maximum number of attempts is reached. The authentication process may be automatic, i.e., performed without user intervention, or it may require a user to input credentials and/or commands into the PED 101.

After authentication and establishing the local data transfer link 155, at step 312, the PED 101 transfers one or more public announcement messages 124b stored on the storage device 146 of the PED 101 to the OPAS 102 via the local data transfer link 155. The PED 101 and the OPAS 102 may use the crewmember and/or PED 101 identifier and/or the OPAS identifier to determine which public announcement messages 124b to transfer to the OPAS 102. This determination may be based upon a crewmember manifest which cross-references the crewmember and/or the particular PED 101 to a particular vehicle 104 and/or OPAS 102 to determine which specific messages are scheduled to be transferred from the PED 101 to the OPAS 102. Step 312 may also be automatic, or prompted in which it requires user input and/or commands to perform the download. In an automatic mode, the PED 101 and/or OPAS 102 automatically determine which public announcement messages 124b to download onto the OPAS 102, and then automatically download such public announcement messages 124b and store them on the storage device 122 of the OPAS 102. In a prompted mode, the PED 101 and/or OPAS 102 determine which messages 124b are available and recommended for transfer to OPAS 102, then display a list of public announcement messages 124b on the PED 101 from which the user can select, and then transfer the selected messages 124 to the OPAS 102 for storage on the storage device 122 of the OPAS 102. After transferring the messages 124b from the PED 101 to the OPAS 102, the local data transfer link may be disconnected/terminated.

In another optional feature, the PED 101 may also be configured to record public announcement messages input by a crew member using a message input device 164 (see FIG. 1) of the PED 101. Again referring to the flow chart of FIG. 3, at step 314, a public announcement message 124b is recorded on the PED 101. The public announcement message 124b may be recorded on the PED 101 at any part of the method 300, even though it is shown in FIG. 3 as occurring after authenticating the PED 101 with the OPAS 102. For instance, the message 124*b* can be recorded on the PED before step 302, or before step 308, or at any other point in the method 300. In order to record an audio message 124*b*, the PED 101 has a microphone 168 (see FIG. 1). A crewmember can then use the microphone 166 to record a public announcement message 124*b* which is then stored on the storage device 146 of the PED 101. In order to record a text message, the PED 101 has a keyboard 168 (see FIG. 1, which may be virtual keyboard displayed on the display 142 or a physical keyboard). A crewmember can they type a text message into the PED 101 using the keyboard 168 which is then stored on the storage device 146 of the PED 101. The PED 101 may then transfer messages recorded on the PED 101 using the same process as step 312, described above. The PED 101 may be configured to include a digital signature in the recorded public announcement messages 124*b* which the OPAS 102 uses to authenticate the message 124 as being from an authorized source. The OPAS 102 can then play any of the messages 124 transferred from the PED 101 to the OPAS 102 via the loudspeakers and/or the entertainment modules 128 using the entertainment system 106. Text messages or audio/visual messages can be displayed via the entertainment modules 128 using the entertainment system 106.

In another feature, the PED 101 and/or the OPAS 102 may have conversion and/or translation software applications to convert messages 124 from audio to text and vice versa, and also to translate messages 124 between various languages, such as from English to Spanish, Spanish to French, Russian to English, etc. The OPAS 102 may then play any of the messages in an original format, and/or in one or more converted and/or translated formats.

In still another optional feature, the PED 101 may be configured to control the playback of public announcement messages 124 on the OPAS 102. Referring to FIG. 3, as described above, the PED 101 has established an authenticated local data transfer link 155 at steps 308-310, such that the PED 101 is authenticated as having valid access to the OPAS 102. Then, at step 316, the PED 101 controls the playback of public announcement messages 124 on the OPAS 102. The PED 101 displays a graphical user interface on its display 142 having various controls and/or commands for controlling the playback of public announcement messages on the OPAS 102. The PED 101 accesses an identifier or title for each of the public announcement messages 124*b* and 124*c* stored on the PED 101 and the OPAS 102, respectively. The PED 101 displays a list of the public announcement messages 124*b* and 124*c*. The graphical user interface allows the user to select one or more of the messages 124 to be played on the OPAS 102. The user selects message(s) 124 using the PED 101, and the PED 101 receives the selection. The user may also enter commands to control the playback of the selected messages on the OPAS 102. For example, the graphical user interface may include various commands and controls for playback, including one or more of the following: start playing one or more messages; stop or pause playback; control the volume of playback, select one or more zones of the vehicle 102 in which a message is played, etc. The zone selection controls allow a message 124 to be played in particular zone(s) of the vehicle 104, such as in one or more of first class, business class and/or coach/economy class. After receiving the PED commands input by a user into the PED 101, the PED 101 sends OPAS commands representative of PED commands to the OPAS 102. The OPAS 102 receives the OPAS commands and performs the playback functions associated with the OPAS commands received from the PED 101. In addition, the PED 101 may be configured to directly play public announcement messages 124*b* stored on the PED 101 on the OPAS 102. The PED 101 may also be configured to be used as a wireless microphone to make announcements on the OPAS 102 using the PED 101. The graphical user interface may include commands for direct play of messages on the PED 101 and for us as a wireless microphone. After selection of direct play of messages, the PED 101 displays a list of the messages stored on the PED 101. The user may select a message to be played, and in response, the PED 101 transmits audio data to the OPAS 102 via the local data transfer link 155 which the OPAS 102 then processes and plays via the loudspeakers 126 and/or the entertainment modules 128.

In yet another optional feature, multiple PEDs 101 may be utilized in the method 300. For example, multiple PEDs 101 may connect to the remote public announcement system 154 and perform authentication processes, as described above. The remote public announcement system 154 may include a scheduler software application for scheduling which public announcement messages 124*c* are transferred to particular PEDs. The scheduling is based upon the PED identifiers and the crewmember manifest. The remote public announcement system 154 may then transfer the public announcements messages 124*c* to the multiple PEDs 101 pursuant to scheduling. For example, several PEDs 101 may be scheduled to travel on the same vehicle according to the crewmember manifest. The remote public announcement system 154 may transfer different messages 124*c* to each of the PEDs 101 so that each PED 101 will only need to receive a smaller amount of data instead of a single PED 101 receiving all of the messages 124*c*. In the case of very large public announcement message data file, such as multimedia files having video and audio, the remote public announcement system 154 may also have a segmenter software application for segmenting a message 124*c* into multiple parts and then uses the scheduler to transfer each part to be transferred to a particular set of PEDs 101 which are scheduled to travel on the same vehicle 104. The set of PEDs 101 can then each connect to the OPAS 102 on the vehicle 104 and transfer each of the segments to the OPAS 102. The OPAS 102 is configured to re-assemble the parts of the segmented message into a public announcement message 124*c* for playback by the OPAS 102.

It is intended that the present invention includes additional embodiments comprising any suitable subset of the steps of the method 300 shown in FIG. 3 and described herein, as well being combined with any of the additional features described herein. For example, another embodiment may include only the steps for downloading a public announcement message 128 from the remote public announcement message server 154 (i.e., steps 302-306). Still another embodiment may include only the steps for transferring a public announcement message 128 from the PED 101 to the OPAS 102 (i.e., steps 308-312). Yet another embodiment may include only the steps for recording a message using the PED 101 and transferring the recorded message 128 from the PED 101 to the OPAS 102 (i.e., steps 314 and 312). Another embodiment many include on the steps for using the PED 101 to control the playback of messages using the OPAS 102. Many other combinations are included.

Although particular embodiments have been shown and described, it is to be understood that the above description is not intended to limit the scope of these embodiments. While embodiments and variations of the many aspects of the invention have been disclosed and described herein, such disclosure is provided for purposes of explanation and illustration only. Thus, various changes and modifications may be made without departing from the scope of the claims. For example, not all of the components described in the embodiments are necessary, and the invention may include any suitable combinations of the described components, and the general shapes and relative sizes of the components of the invention may be modified. Accordingly, embodiments are intended to exemplify alternatives, modifications, and equivalents that may fall within the scope of the claims. The invention, therefore, should not be limited, except to the following claims, and their equivalents.

What is claimed is:

1. A personal electronic device for transferring a public announcement message to an onboard public announcement system (OPAS) installed on a vehicle, the personal electronic device comprising:
   a storage device for storing electronic data;
   a data networking module configured to establish a wireless network connection to the OPAS;
   a software application configured to program the personal electronic device to:
      establish a wireless remote data transfer link to a remote public announcement message server, download the public announcement message from the remote public announcement message server via the remote data transfer link, and store the public announcement message on the storage device;
      receive an identifier associated with the OPAS and determine that the public announcement message is for transfer to the OPAS based on the identifier; and
      establish a wireless local data transfer link to the OPAS using the data networking module, and transmit the public announcement message stored on the storage device to the OPAS via the wireless local data transfer link.

2. The personal electronic device of claim 1, wherein the software application is configured to transmit authentication data to the OPAS for authenticating the personal electronic device to allow the personal electronic device to transmit the public announcement message to the OPAS, and only transmitting the public announcement message stored on the storage device to the OPAS upon authentication of the personal electronic device.

3. The personal electronic device of claim 2, wherein the software application is configured to program the personal electronic device to automatically perform each of the following: establish the local data transfer link to the OPAS when the personal electronic device is within wireless networking range of the OPAS; after establishing the local data transfer link, transmit the authentication data to the OPAS; and upon authentication, transmit the public announcement message stored on the storage device to the OPAS.

4. The personal electronic device of claim 2, wherein the authentication of the personal electronic device is based upon a crew member manifest associating the personal electronic device to the vehicle.

5. The personal electronic device of claim 1, wherein the personal electronic device further comprises a secondary data networking module operating on a different modality than the data networking module.

6. The personal electronic device of claim 1, wherein the software application is configured to program the personal electronic device to automatically perform each of the following: establish the remote data transfer link to the remote public announcement message server when the personal electronic device detects an internet connection; download the public announcement message from the remote public announcement message server via the remote data transfer link; and store the public announcement message on the storage device.

7. The personal electronic device of claim 1, wherein the software application is configured to program the personal electronic device to: receive the second public announcement message from a crew member who inputs the second public announcement into the PED via an input device of the PED; and store the second public announcement message on the PED.

8. The personal electronic device of claim 7, wherein the input device is selected from the group consisting of: a microphone wherein the public announcement message comprises an audio message, and a keyboard wherein the public announcement message comprises a text message.

9. The personal electronic device of claim 1, wherein the software application is configured to program the personal electronic device to control the playback of public announcement messages on the OPAS.

10. The personal electronic device of claim 9, wherein the software application is configured to program the personal electronic device to display a graphical user interface on a display of the personal electronic device for controlling the playback of public announcement messages on the OPAS, including displaying a list of public announcement messages stored on the OPAS from which a crew member can select a public announcement message to play, playback controls, and a zone control for playing a public announcement message in a particular zone of the vehicle.

11. A system for distributing a public announcement message and playing the public announcement message on a vehicle, the system comprising:
   an onboard public announcement system (OPAS) installed on a vehicle, the OPAS having an OPAS networking module, and an OPAS storage device for storing public announcement messages, the OPAS configured to play public announcement messages to passengers on the vehicle; and
   a personal electronic device (PED), comprising:
      a PED storage device;
      a PED networking module configured to establish a network connection to the OPAS networking module to transmit the public announcement message stored on the data storage device to the OPAS;
      a PED software application configured to program the PED to:
         establish a wireless remote data transfer link to a remote public announcement message server, download the public announcement message from the remote public announcement message server via the remote data transfer link, and store the public announcement message on the storage device;
         receive an identifier associated with the OPAS and determine that the public announcement message is for transfer to the OPAS based on the identifier;
         establish a local data transfer link to the OPAS using the PED data networking module, and transmit the public announcement message stored on the storage device to the OPAS via the local data transfer link;
      wherein the OPAS is configured to receive the public announcement message from the PED via the local data transfer link and store the public announcement message on the OPAS storage device.

12. The system of claim 11, where in the PED software application is configured to transmit authentication data to the OPAS for authenticating the PED to allow the PED to transmit the public announcement message to the OPAS, and after authentication of the PED by the OPAS, and only transmitting the public announcement message stored on the storage device to the OPAS upon authentication of the PED; and the OPAS is configured to receive the authentication data from the PED, determine whether to authenticate the PED based on the authentication data, and upon authentication of the PED, receive the public announcement message from the PED and store the public announcement message on the OPAS storage device.

13. The personal electronic device of claim 12, wherein the software application is configured to program the PED to automatically perform each of the following: establish the local data transfer link to the OPAS when the personal electronic device is within wireless networking range of the OPAS; after establishing the local data transfer link, transmit the authentication data to the OPAS; and upon authentication, transmit the public announcement message stored on the storage device to the OPAS.

14. The system of claim 12, wherein the authentication of the PED is based upon a crew member manifest associating the PED to vehicle.

15. The system of claim 11, further comprising a remote public announcement message server on which public announcement messages are stored; and wherein the PED software application is configured to automatically perform each of the following: establish the remote data transfer link to the remote public announcement message server when the personal electronic device detects an internet connection; download the public announcement message from the remote public announcement message server via the remote data transfer link; and store the public announcement message on the storage device.

16. The system vice of claim 11, wherein the software application is configured to program the PED to: receive a second public announcement message from a crew member who inputs the second public announcement into the PED via an input device of the PED; and store the second public announcement message on the PED.

17. The system 16, wherein the input device is selected from the group consisting of: a microphone wherein the public announcement message comprises an audio message; and a keyboard wherein the public announcement message comprises a text message.

18. The system of claim 11, wherein the software application is configured to program the personal electronic device to control the playback of public announcement messages on the OPAS, including displaying a graphical user interface on a display of the personal electronic device for controlling the playback of public announcement messages on the OPAS, the graphical user interface including a display of a list of public announcement messages stored on the OPAS from which a crew member can select a public announcement message to play, playback controls, and a zone control for playing a public announcement message in a particular zone of the vehicle.

19. A method for distributing a public announcement message to an onboard public announcement system (OPAS) installed on a vehicle, comprising:
providing a personal electronic device (PED) comprising a storage device for storing electronic data, a data networking module configured to establish a network connection to the OPAS to transmit the public announcement message stored on the data storage device to the OPAS, and a software application configured to program the personal electronic device;
establishing a wireless remote data transfer link to a remote public announcement message server, download the public announcement message from the remote public announcement message server via the remote data transfer link, and store the public announcement message on the storage device;
transmitting an identifier associated with the OPAS from the OPAS to the PED and determining that the public announcement message is for transfer to the OPAS based on the identifier; and
establishing a local data transfer link between the PED and the OPAS using the data networking module;
transmitting authentication data from the PED to the OPAS for authenticating the PED to allow the PED to transmit the public announcement message to the OPAS;
upon authentication of the PED, transmitting the public announcement message stored on the storage device to the OPAS.

20. The method of claim 19, further comprising:
the OPAS receiving the authentication data from the PED;
the OPAS determining whether to authenticate the PED based on the authentication data
after authentication of the PED, the OPAS sending a message to the PED indicating that the PED is authenticated, receiving the public announcement message from the PED and storing the public announcement message on the OPAS storage device.

* * * * *